US010747195B2

(12) United States Patent
Peterson et al.

(10) Patent No.: US 10,747,195 B2
(45) Date of Patent: Aug. 18, 2020

(54) SYSTEM AND METHOD FOR CONTROLLING THE ACTUATION OF WING SECTIONS OF AN IMPLEMENT DURING AN UNFOLDING OPERATION

(71) Applicant: CNH Industrial Canada, Ltd., Saskatoon (CA)

(72) Inventors: Klint J. Peterson, Mackinaw, IL (US); Christopher Barrick, Morton, IL (US); James W. Henry, Saskatchewan (CA); Tracey D. Meiners, Mackinaw, IL (US)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 351 days.

(21) Appl. No.: 15/795,494

(22) Filed: Oct. 27, 2017

(65) Prior Publication Data

US 2019/0129375 A1  May 2, 2019

(51) Int. Cl.
*G05B 19/406* (2006.01)
*A01B 73/04* (2006.01)
*A01B 63/00* (2006.01)
*A01B 63/14* (2006.01)
*A01M 7/00* (2006.01)

(52) U.S. Cl.
CPC .......... *G05B 19/406* (2013.01); *A01B 63/008* (2013.01); *A01B 63/14* (2013.01); *A01B 73/046* (2013.01); *A01M 7/0075* (2013.01); *G05B 2219/31154* (2013.01); *G05B 2219/45017* (2013.01)

(58) Field of Classification Search
CPC ........ G05B 19/406; G05B 2219/31154; G05B 2219/45017; A01B 63/008; A01B 63/14; A01B 73/046; A01M 7/0075

USPC .......................................................... 701/50
See application file for complete search history.

(56) References Cited

U.S. PATENT DOCUMENTS 3,214,189 A  10/1965 Annat
3,732,932 A   5/1973 Taube
(Continued)

FOREIGN PATENT DOCUMENTS

GB           747674        4/1956

OTHER PUBLICATIONS

Husky Towing Products "Weight Distribution Sway Control" http://www.huskytow.com.

Primary Examiner — Marthe Y Marc-Coleman
(74) Attorney, Agent, or Firm — Rebecca L. Henkel; Rickard K. DeMille

(57) ABSTRACT

A method for controlling the actuation of wing sections of an agricultural implement may include regulating a supply of hydraulic fluid to a wing actuator coupled to a wing section to pivot the wing section relative to a center frame section of the implement from a transport position towards a work position. The method may also include monitoring a wheel load associated with at least one wheel of the wing section as the wing section is being moved towards the work position and detecting when the wheel(s) of the wing section contacts the ground based at least in part on the monitored wheel load. In addition, the method may include adjusting one or more flow parameters of the supply of hydraulic fluid to the wing actuator to reduce an actuation rate at which the wing section is being pivoted after detecting that wheel(s) has contacted the ground.

20 Claims, 4 Drawing Sheets

(56) References Cited

U.S. PATENT DOCUMENTS

| | | |
|---|---|---|
| 3,734,195 A | 5/1973 | Cantral |
| 4,454,919 A | 6/1984 | Arnold |
| 5,201,372 A | 4/1993 | Thompson et al. |
| 6,701,857 B1 | 3/2004 | Jensen et al. |
| 7,740,084 B2 | 6/2010 | Rosenboom |
| 8,602,153 B2 | 12/2013 | Osswald et al. |
| 8,700,274 B1 | 4/2014 | Tejeda et al. |
| 9,185,845 B2 | 11/2015 | Van Mill et al. |
| 9,198,343 B2 | 12/2015 | Mariman et al. |
| 9,883,623 B2 * | 2/2018 | Koch ................... A01B 73/065 |
| 2008/0257569 A1 | 10/2008 | Foster et al. |
| 2012/0099948 A1 | 4/2012 | Bump et al. |
| 2012/0316678 A1 * | 12/2012 | Asakawa .......... H01L 21/67769 700/251 |
| 2014/0000919 A1 * | 1/2014 | Bachman ............. A01B 73/044 172/1 |
| 2014/0379230 A1 * | 12/2014 | Koch ................... A01B 73/065 701/50 |
| 2015/0013579 A1 * | 1/2015 | Mariman ............... A01B 76/00 111/59 |
| 2016/0338257 A1 * | 11/2016 | Sauder .................. A01C 7/203 |
| 2017/0118901 A1 | 5/2017 | Stark |
| 2018/0077849 A1 * | 3/2018 | Fanshier ............... A01B 63/28 |

* cited by examiner

SYSTEM AND METHOD FOR CONTROLLING THE ACTUATION OF WING SECTIONS OF AN IMPLEMENT DURING AN UNFOLDING OPERATION

FIELD OF THE INVENTION

The present subject matter relates generally to unfolding operations for agricultural implements and, more particularly, to a system and method for controlling the actuation of wing sections of an agricultural implement during an unfolding operation based on monitored wheel loads.

BACKGROUND OF THE INVENTION

Farmers utilize a wide variety of tillage implements to prepare soil for planting, such as disc rippers, cultivators, and/or the like. To make tillage operations as efficient as possible, very wide swaths may be covered by extending wing sections on either side of a central frame section of a tillage implement. Typically, each wing section includes one or more frame members, a plurality of ground-engaging tools coupled to the frame member(s), and one or more associated support wheels. Each wing section is typically configured to be pivoted relative to the central frame section between a work position, at which the wing section is positioned adjacent to the ground, and a transport position, at which the wing section is pivoted upwardly relative to the central frame section away from the ground.

To transition the wing sections from the work position to the transport position, a folding operation is performed in which the wing sections are moved via control of the operation of the associated hydraulic cylinders to allow the wing sections to be folded upwardly relative to the central frame section of the implement. A reverse unfolding operation may be performed to transition the wing sections from the transport position to the work position in which the operation of the hydraulic cylinders is controlled to pivot the wing sections downwardly relative to the central frame section back towards the ground. When performing the unfolding operation, conventional folding systems typically utilize proximity switches or potentiometers to monitor the position of the wing sections relative to the central frame section. However, such position monitoring often provides inadequate feedback for accurately and efficiently controlling the actuation of the wings. Moreover, since these conventional systems rely on detecting the relative positions between the wing sections and the center frame section, such systems do not provide a direct indication of the positioning of the wing sections relative to the ground, which can lead to issues with effectively controlling the wing actuation.

Accordingly, an improved system and method for controlling the actuation of wing sections of an agricultural implement during an unfolding operation that addresses one or more issues in the prior art would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling the actuation of wing sections of an agricultural implement during an unfolding operation. The method may include regulating, with one or more computing devices, a supply of hydraulic fluid to a wing actuator coupled to a wing section of the agricultural implement to pivot the wing section relative to a center frame section of the agricultural implement from a transport position towards a work position. The method may also include monitoring, with the one or more computing devices, a wheel load associated with at least one wheel of the wing section as the wing section is being moved towards the work position and detecting, with the one or more computing devices, when the at least one wheel of the wing section contacts the ground based at least in part on the monitored wheel load. In addition, the method may include adjusting, with the one or more computing devices, one or more flow parameters of the supply of hydraulic fluid to the wing actuator to reduce an actuation rate at which the wing section is being pivoted relative to the center frame section after detecting that the at least one wheel has contacted the ground.

In another aspect, the present subject matter is directed to a system for controlling the actuation of implement wing sections during an unfolding operation. The system may include an agricultural implement including a center frame section and a wing section pivotable relative to the center frame section, the wing section including at least one wheel coupled thereto. The system may also include a wing actuator coupled to the wing section, with the wing actuator being configured to pivot the wing section relative to the center frame section between a transport position and a work position. In addition, the system may include a valve assembly configured to regulate a supply of hydraulic fluid to the wing actuator and at least one controller communicatively coupled to the valve assembly. The controller(s) may include a processor and associated memory. The memory may store instructions that, when executed by the processor, configure the controller(s) to control an operation of the valve assembly to regulate the supply of hydraulic fluid to the wing actuator in order to pivot the wing section relative to the center frame section from the transport position towards the work position. The controller(s) may also be configured to monitor a wheel load associated with at least one wheel of the wing section as the wing section is being moved towards the work position and detect when the at least one wheel of the wing section contacts the ground based at least in part on the monitored wheel load. Moreover, the controller(s) may also be configured to control the operation of the valve assembly to adjust one or more flow parameters of the supply of hydraulic fluid to the wing actuator to reduce an actuation rate at which the wing section is being pivoted relative to the center frame section after detecting that the at least one wheel has contacted the ground.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
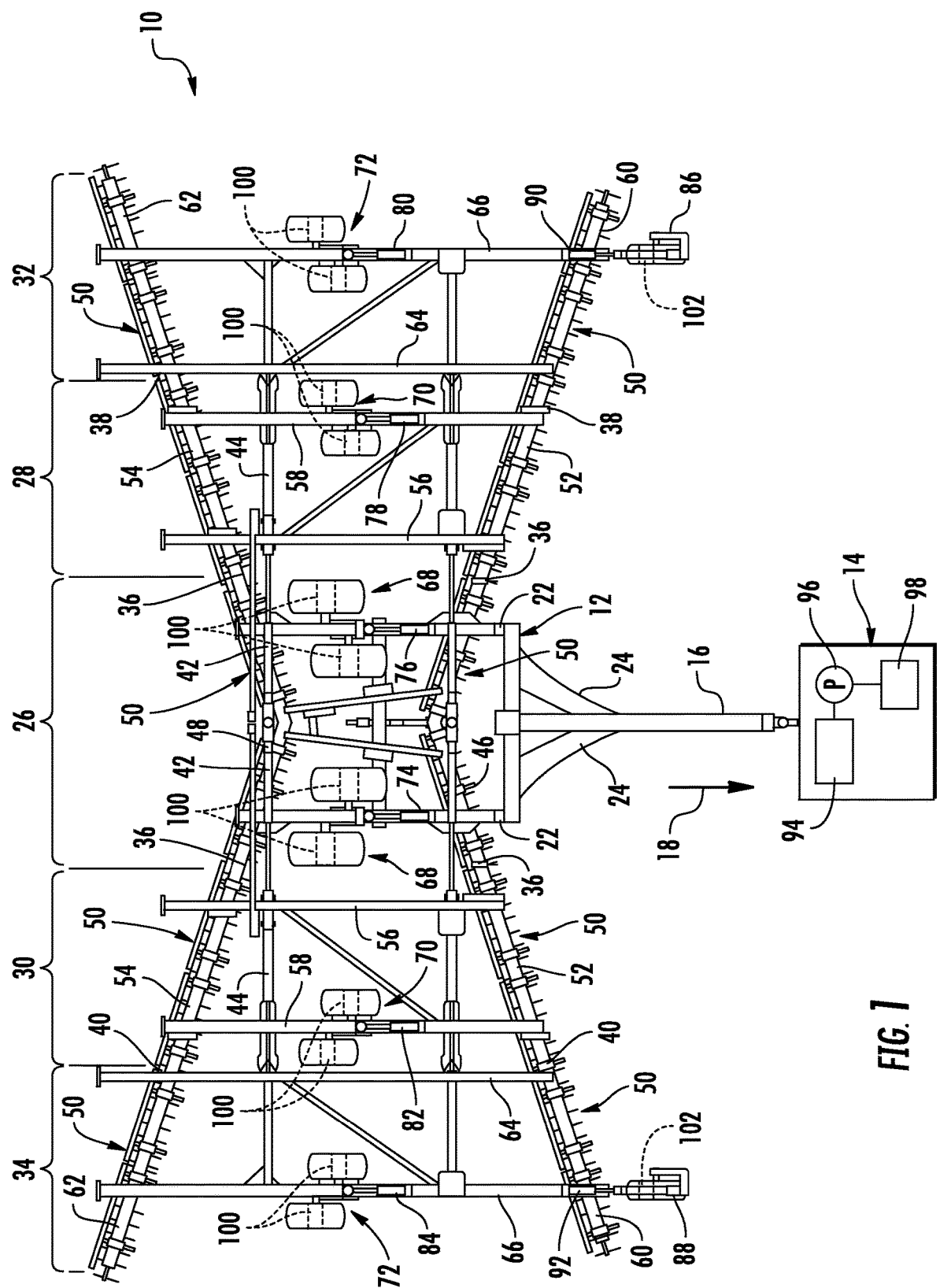
FIG. 1 illustrates a top view of one embodiment of an agricultural implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling the actuation of wing sections of an agricultural implement during the performance of an unfolding operation. Specifically, in several embodiments, one or more wheel load sensors may be provided in operative association with one or more of the wheels supported on each of the wing sections of the implement to directly or indirectly detect the wheel load(s) being applied through such wheel(s). In such an embodiments, when a given wing section(s) is being actuated or pivoted downwardly towards the ground during an unfolding operation, a controller(s) of the system may continuously monitor the wheel load(s) applied through the wheel(s) of such wing section(s) to determine when the wheel(s) contact the ground, thereby providing an indication that the flow rate and/or pressure of the hydraulic fluid being supplied to the associated wing actuator(s) should be reduced to effect a decrease in the actuation rate of the wing section(s). For instance, hydraulic fluid may be initially supplied to the wing actuator(s) at a relatively high flow rate and/or pressure (e.g., a maximum allowable flow rate and/or pressure) to allow the wing section(s) to be pivoted downwardly at a relative fast rate, thereby reducing the time required for performing the unfolding operation. However, once it is detected that the wheel(s) of the wing section(s) being actuated has contacted the ground, the flow rate and/or pressure may be reduced to decrease the actuation rate of the wing section(s), thereby allowing for more accurate control of the wing actuation. The wing section(s) may then continue to be actuated at the reduced actuation rate until the monitored wheel load(s) applied through the wheel(s) of such wing section(s) is equal to a desired wheel load (or falls within a desired wheel load range).

Referring now to FIG. 1, a top view of one embodiment of a multi-section implement 10 is illustrated in accordance with aspects of the present subject matter. As shown, the implement 10 is configured as a multi-section disc ripper. However, in other embodiments, the implement 10 may have any other suitable implement configuration, such as by being configured as any other suitable multi-section implement, including any other suitable tillage implement (e.g., a cultivator) or other implement (e.g., a planter, seeder, sprayer, fertilizer, and/or the like).

As shown, the implement 10 includes a carriage frame assembly 12 configured to be towed by a traction unit, such as a work vehicle (shown schematically in FIG. 1 as box 14). The carriage frame assembly 12 may generally include a pull hitch 16 extending in a forward travel direction 18 of the implement 10, and forward and aft oriented carrier frame members 22 which are coupled with and extend from the pull hitch 18. Additionally, reinforcing gusset plates 24 may be used to strengthen the connection between the pull hitch 18 and the carrier frame members 22.

As shown in FIG. 1, the tillage implement 10 is configured as a multi-section implement including a plurality of frame sections. Specifically, in the illustrated embodiment, the tillage implement 10 includes a center frame section 26, inner right and left wing frame sections 28, 30 pivotally coupled to the center frame section 26, and outer right and left wing frame sections 32, 34 pivotally coupled to the inner wing sections 28, 30. For example, the center section 26 is pivotally coupled to the inner wing sections 28, 30 at pivot joints 36. Similarly, the inner right wing section 28 is pivotally coupled to the outer right wing section 32 at pivot joints 38 while the inner left wing section 30 is pivotally coupled to the outer left wing section 34 at pivot joints 40. As is generally understood, the pivot joints 36, 38, 40 may be configured to allow relative pivotal motion between adjacent frame sections of the implement 10. For example, the pivot joints 36, 38, 40 may allow for articulation of the various frame sections between a work position, in which the frame sections are all disposed substantially in a common plane, and a transport position, in which the wing sections 28, 30, 32, 34 are folded inwardly relative to the center frame section 26 reduce the overall width of the implement 10. An example folding sequence for the implement 10 will be described below with reference to FIGS. 2A-2C.

Additionally, as shown in FIG. 1, the implement 10 may include inner wing actuators 42 coupled between the center frame section 26 and the inner wing sections 28, 30 to enable pivoting between the field and transport positions. For example, by retracting/extending the inner wing actuators 42, the inner wing sections 28, 30 may be pivoted relative to the center frame section 26 about the pivot joints 36, thereby allowing the inner wing sections 28, 30 to be folded relative to the center frame section 26 from the work position to the transport position and also unfolded relative to the center frame section 26 from the transport position back to the work position. Moreover, the implement 10 may also include outer wing actuators 44 coupled between each inner wing section 28, 30 and its adjacent outer wing section 32, 34. As such, by retracting/extending the outer wing actuators 44, each outer wing section 32, 34 may be pivoted relative to its respective inner wing section 28, 30, thereby allowing the outer wing sections 32, 34 to be folded relative to the inner wing sections 28, 30 and the center frame section 26 from the work position to the transport position and also unfolded relative to the inner wing sections 28, 30 and the center frame section 26 from the transport position back to the work position.

Moreover, each of the frame sections may include one or more frame members for supporting one or more ground-engaging tools. For instance, the center frame section 26 includes a forward frame member 46 coupled to the carrier frame 22 at its front end and an aft frame member 48 coupled to the carrier frame 22 at its aft end. Additionally, each inner wing section 28, 30 includes a forward frame member 52 and an aft frame member 54, with such frame members 52, 54 being interconnected by forward and aft oriented inner and outer frame members 56, 58. In one embodiment, the forward and aft frame members 52, 54 of the inner wing sections 28, 30 may generally form an extension of the forward and aft frame members 46, 48 of the center frame section 26. Similarly, each outer wing section 32, 34 includes forward and aft frame members 60, 62, with such frame members being interconnected by inner and outer frame members 64, 66.

In the illustrated embodiment, each of the frame members 46, 48, 52, 54, 60, 62 is configured to support one or more gangs of disc blades 50. In such an embodiment, the gangs of disc blades 50 may be resiliently connected to the frame members 46, 48, 52, 54, 60, 62 in any suitable manner so as to provide smooth working of the soil. However, it should be appreciated that, in other embodiments, any other suitable ground-engaging tools may be supported by the various frame members, such as shanks, tines, rolling baskets, and/or the like.

In several embodiments, the various frame sections 26, 28, 30, 32, 34 of the tillage implement 10 may be configured to be positioned at variable positions relative to the soil in order to set the position of the gangs of disc blades 50 above the soil as well as the penetration depth of the disc blades 50. For example, in the illustrated embodiment, the tillage implement 10 includes center transport wheels 68 pivotally interconnected with the carrier frames 22 so that they provide support to the forward and aft frame members 46 and 48 relative to the soil. Similarly, inner wing transport wheels 70 may be interconnected with the frame elements 58 to support and variably position the inner wing sections 28, 30 relative to the soil. In addition, outer wing transport wheels 72 may be pivotally mounted on the frame members 66 to support and variably position the outer wing sections 32, 34 relative to the soil.

In such an embodiment, wheel actuators may also be provided in operative association with the various wheels to adjust the relative positioning between the frame sections and the ground. For instance, center wheel actuators 74, 76 may be utilized to manipulate the center wheels 68 to establish the distance of the center frame section 26 relative to the soil while inner wing wheel actuators 78, 82 may be used to variably position the inner wing sections 28, 30 relative to the soil. Similarly, outer wing wheel actuators 80, 84 may be used to variably position the outer wing sections 32, 34 relative to the soil.

It should be appreciated that the implement 10 may also include gauge wheels 86, 88 on the outer wing sections 32, 34 to orient the fore-to-aft angle of the tillage implement 10 relative to the soil. In such an embodiment, gauge wheel actuators 90, 92 may be provided in operative association with the gauge wheels 86, 88 to allow the fore-to-aft angle of the implement 10 to be adjusted. As shown in FIG. 1, in one embodiment, the gauge wheels 86, 88 may correspond to the forward-most ground-engaging components of the implement 10.

It should be also appreciated that, in several embodiments, the various actuators described above may correspond to hydraulically-activated actuators, such as hydraulic cylinders. In such embodiments, the flow of hydraulic fluid to the various actuators may be controlled, for example, via one or more valve assemblies 94 located on and/or within the work vehicle 14 configured to tow the implement 10. For instance, the work vehicle 14 may include a pump 96 configured to supply a flow of pressurized hydraulic fluid from a fluid supply 98 to the valve assembly(ies) 94. The valve assembly(ies) 94 may, in turn, be controlled so as to regulate the supply of hydraulic fluid to the various actuators on the implement 10. As will be described in greater detail below, the operation of the valve assembly(ies) 94 may be electronically controlled via one or more controllers of the disclosed system.

Referring still to FIG. 1, in several embodiments, the implement 10 may also include one or more wheel load sensors 100, 102 configured to directly or indirectly detect the load applied through one or more of the wheels 68, 70, 72, 86, 88 of the implement 10, thereby providing an indication of the weight of the associated frame section on which the wheel(s) is supported. For instance, in the illustrated embodiment, one or more wheel load sensors are installed in association with each wheel or set of wheels of the various frame sections of the implement 10, thereby allowing the wheel loads for each individual wheel(s) to be monitored separately. Specifically, as shown in FIG. 1, a transport wheel load sensor(s) 100 may be installed relative to each set of transport wheels 68, 70, 72 to monitor the wheel load applied through such wheels. Similarly, a gauge wheel load sensor(s) 102 may be installed relative to each set of gauge wheels 86, 88 to monitor the wheel load applied through such wheels. As will be described below, the sensor data associated with the loading on each wheel(s) 68, 70, 72, 86, 88 may be transmitted to the associated system controller(s) for subsequent processing and/or analysis. For instance, the controller may monitor the wheel loads as the wings sections 28, 30, 32, 34 are being unfolded from the transport position to the work position. In such an embodiment, the controller may utilize the load measurements to determine when the wheel(s) supported by each wing section initially contacts the ground, which may serve as a control input for adjusting one or more flow parameters of the hydraulic fluid being supplied to the wing actuators 42, 44.

It should be appreciated that the various wheel load sensors 100, 102 may generally correspond to any suitable sensors installed at any suitable location on and/or within the implement 10 that allows each sensor to monitor the load(s) applied through its respective wheel(s). For instance, in one embodiment, each load sensor 100, 102 may be provided in operative association with one of the wheel actuators 74-84, 90, 92 to detect the load applied through each corresponding wheel(s) 68, 70, 72, 86, 88 based on the load(s) sensed at each wheel actuator 74-84, 90, 92. Specifically, in such an embodiment, each load sensor 100, 102 may, for example, correspond to a load pin coupled to each wheel actuator 74-84, 90, 92 at one of its respective pivot joints (e.g., at the joint defined between each wheel actuator and the adjacent frame section and/or at the joint defined between each wheel actuator and the respective wheel(s)) to monitor the load applied through such wheel actuator 74-84, 90, 92, thereby providing an indication of the load applied through the associated wheel(s) 68, 70, 72, 86, 88. In another embodiment, each load sensor 100, 102 may be provided in operative association with a corresponding wheel(s) 68, 70, 72, 86, 88 to provide a direct measurement of the wheel load(s). For instance, each load sensor 100, 102 may correspond to a load cell(s) installed in association with the axle of an associated wheel(s) 68, 70, 72, 86, 88 to monitor the loads applied through such wheel(s).

It should be appreciated that the configuration of the implement 10 described above and shown in FIG. 1 is provided only to place the present subject matter in an exemplary field of use. Thus, it should be appreciated that the present subject matter may be readily adaptable to any manner of implement configuration. For example, in an alternative embodiment, the implement 10 may only include a single wing section disposed along each side of the central frame section 26 or the implement 10 may include three or more wing sections disposed along each side of the central frame section 26. Similarly, in another embodiment, any other suitable type of ground-engaging tool (or any combination of ground-engaging tools) may be coupled to or otherwise supported by the various frame sections 26, 28, 30, 32, 34 of the implement 10, including discs, shanks, tines, baskets, and/or the like.

Figure 2A:
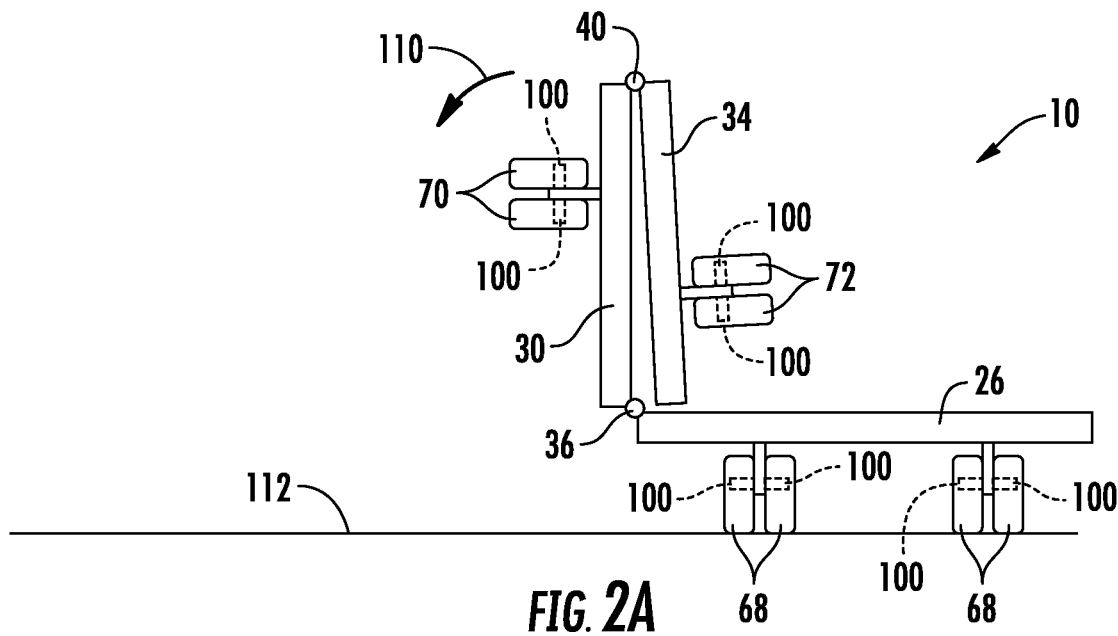
FIGS. 2A-2C illustrate schematic views of a left-side portion of the implement shown in FIG. 1, particularly illustrating a sequence of views providing an example of one embodiment of a series of unfolding actions that can be performed when executing an unfolding operation in accordance with aspects of the present subject matter.
Figure 2B:
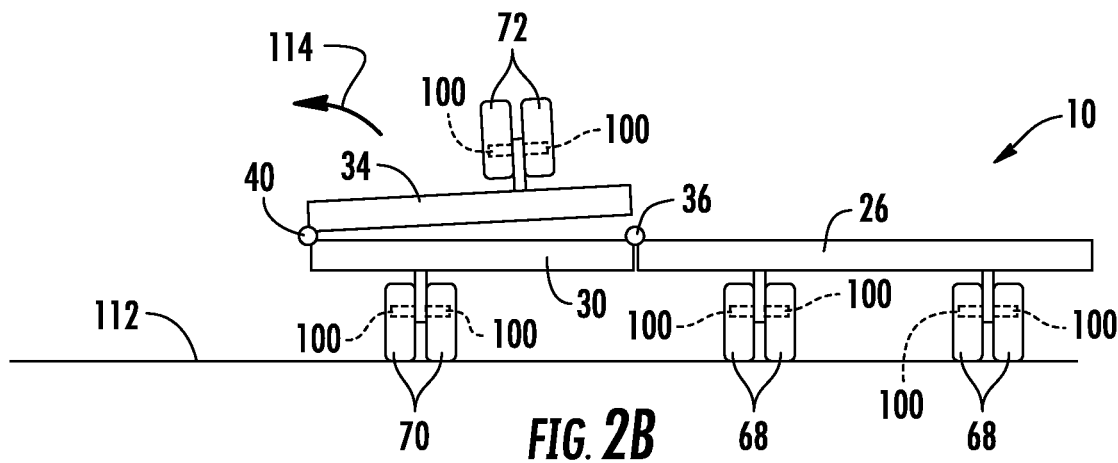
Figure 2C:
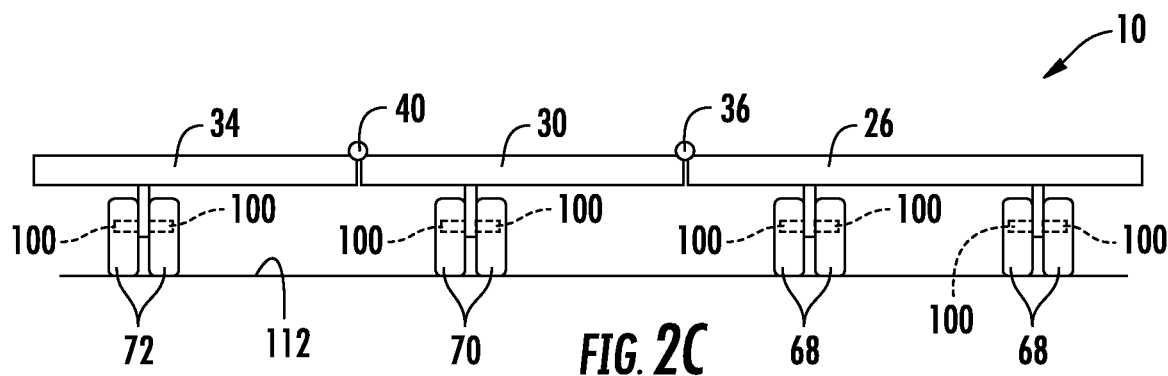

Referring now to FIGS. 2A-2C, various schematic views of a left-side portion of the implement 10 (e.g., the left-side wing sections 30, 34 and the center frame section 26) are illustrated in accordance with aspects of the present subject matter, particularly illustrating the left-side portion of the implement 10 with the ground-engaging tools removed to illustrate the transport wheels 68, 70, 72 supported by the illustrated frame sections 26, 30, 34. Specifically, FIGS. 2A-2C illustrate one example of an unfolding sequence that may be executed when unfolding the wing sections 28, 30, 32, 34 from the transport position to the work position. It should be appreciated that, although FIGS. 2A-2C are only described with reference to unfolding the left-side wing sections 30, 34, the same sequence of operations may also be used to unfold the right-side wing sections 28, 32 from the transport position to the work position.

As shown in FIG. 2A, when at the transport position, the wing sections 30, 34 may be oriented generally vertically, with the inner wing section 30 being folded upwardly relative to the center frame section 26 approximately 90 degrees and the outer wing section 34 being folded relative to the inner frame section approximately 180 degrees. To move the wing sections 30, 34 from the transport position to the work position, the inner wing section 30 may be initially pivoted downwardly relative to the center wing section 26 about the respective pivot joint 36 (e.g., as indicated by arrow 110 in FIG. 2A) at a desired actuation rate by supplying hydraulic fluid at a given flow rate and/or pressure to the inner wing actuator 42 (FIG. 1) coupled between the center frame section 26 and the inner wing section 30 (e.g., at a maximum flow rate and/or a maximum pressure for the wing actuator 42). As the inner wing section 30 is pivoted downwardly, the load applied through the wing's transport wheel(s) 70 may be continuously monitored (e.g., via the wheel load sensor(s) 100) to determine when the wheel(s) 70 initially contacts the ground 112. For instance, as the inner wing transport wheel(s) 70 initially contacts the ground 112, a reactive force may be applied through the wheel(s) 70 that can be detected as an increase in the wheel load(s) by the wheel load sensor(s) 100, which may generally provide an indication of the amount of wing weight being supported by the inner wing section 30. As will be described below, once it is detected that the transport wheel(s) 70 contact the ground 112, one or more of the flow parameters of the hydraulic fluid supplied to the associated inner wing actuator 42 may be reduced to decrease the rate at which the inner wing section 30 is being pivoted downwardly relative to the center frame section 26. The inner wing section 30 may then continue to be pivoted downwardly relative to the center frame section 26 at the reduced actuation rate until the wheel load detected by the associated wheel load sensor(s) 100 is equal to a desired wheel load and/or falls within a desired wheel load range set for the inner wing section 30.

Additionally, to move the outer wing section 34 to the work position, the outer wing section 34 may be pivoted relative to the inner wing section 30 about the respective pivot joint 40 (e.g., as indicated by arrow 114 in FIG. 2B) at a desired actuation rate by supplying hydraulic fluid at a given flow rate and/or pressure to the outer wing actuator 44 coupled between the inner wing section 30 and the outer wing section 34 (e.g., at a maximum flow rate and/or a maximum pressure for the wing actuator 44). As the outer wing section 34 is pivoted towards the ground 112, the load applied through the wing's transport wheel(s) 72 and/or the gauge wheel(s) 88 (not shown in FIGS. 2A-2C) may be continuously monitored (e.g., via the wheel load sensor(s) 100, 102) to determine when the wheel(s) 72 88 initially contact the ground 112. For instance, as the wheel(s) 72, 88 initially contact the ground, a reactive force may be applied through the wheel(s) that can be detected as an increase in the wheel load(s) by the associated wheel load sensor(s) 100, which may generally provide an indication of the amount of wing weight being supported by the outer wing section 34. As will be described below, once it is detected that the wheel(s) 72, 88 contact the ground 112, one or more of the flow parameters of the hydraulic fluid supplied to the associated outer wing actuator 44 may be reduced to decrease the rate at which the outer wing section 34 is being pivoted downwardly relative to the inner wing section 30. The outer wing section 34 may then continue to be pivoted downwardly relative to the inner frame section 30 at the reduced actuation rate until the wheel load detected by the associated wheel load sensor(s) 100, 102 is equal to a desired wheel load and/or falls within a desired wheel load range set for the outer wing section 34.

In the illustrated sequence of operations shown in FIGS. 2A-2C, the wing sections 30, 34 are actuated consecutively to move the wing sections from the transport position to the work position, with the inner wing section 30 being initially actuated and the outer wing section 34 being actuated once the transport wheel(s) 70 of the inner wing section 30 contact the ground. However, in other embodiments, the wing sections 30, 34 may be actuated simultaneously across all or a portion of the unfolding process. For instance, in one embodiment, the outer wing section 34 may begin to be pivoted relative to the inner wing section 30 simultaneous with initiation of pivoting of the inner wing section 30 relative to the center frame section 26. In another embodiment, the outer wing section 34 may begin to be pivoted relative to the inner wing section 30 after the inner wing section 30 has begun to be pivoted relative to the center frame section 26, but prior to the transport wheel(s) 70 of the inner wing section 30 contacting the ground.

Figure 3:
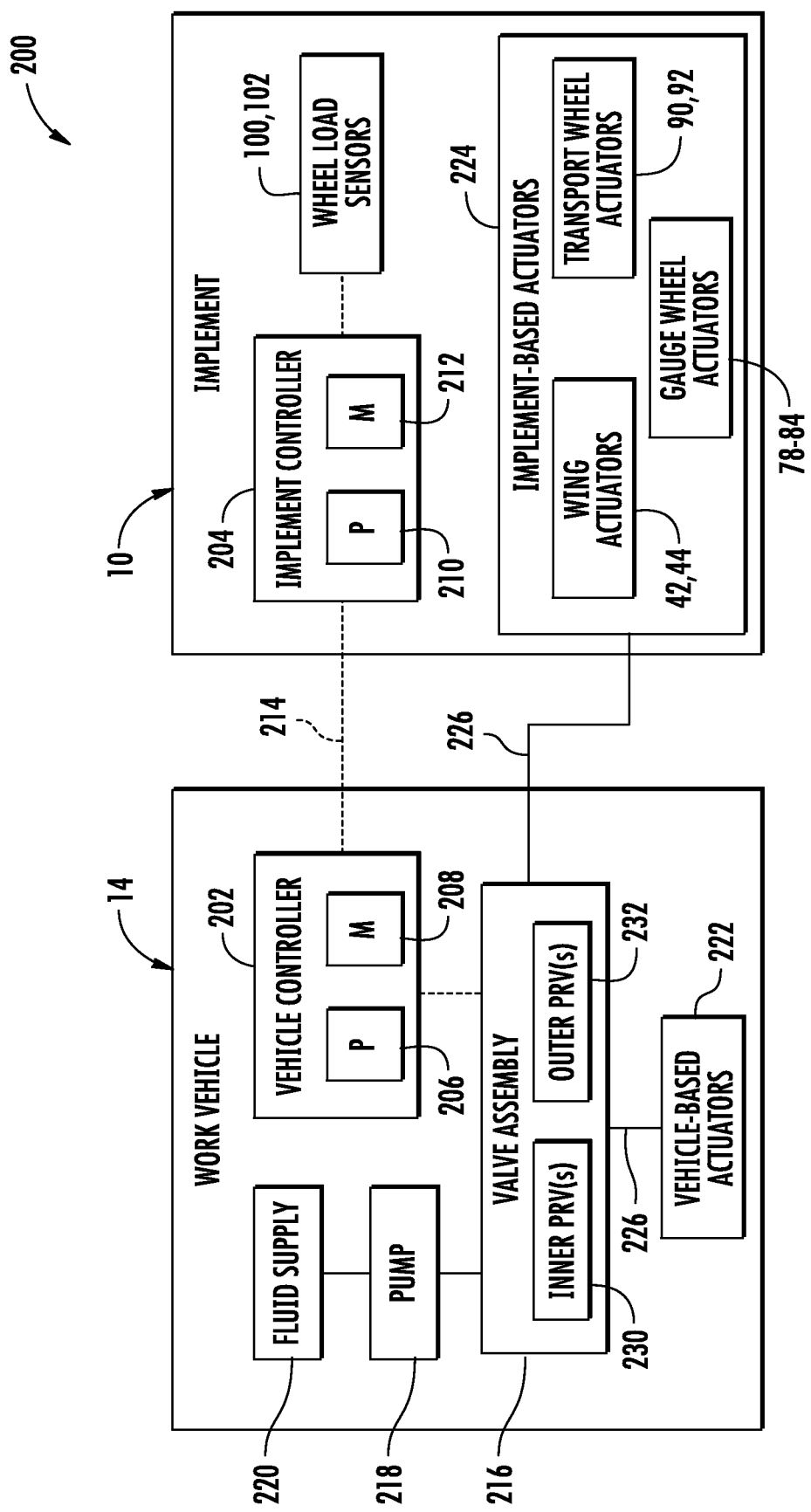
FIG. 3 illustrates a schematic view of one embodiment of a system for controlling the actuation of wing sections of an agricultural implement during an unfolding operation in accordance with aspects of the present subject matter.

Referring now to FIG. 3, a schematic view of one embodiment of a system 200 for controlling the actuation of wing sections of an agricultural implement during the performance of an unfolding operation is illustrated in accordance with aspects of the present subject matter. In general, the system 200 will be described herein with reference to the implement 10 described above and shown in FIGS. 1 and 2A-2C. However, it should be appreciated that the disclosed system 200 may generally be utilized with any suitable implement have any suitable implement configuration. Additionally, it should be appreciated that hydraulic or fluid couplings of the system 200 shown in FIG. 3 are indicated by bold lines. Similarly, communicative links or electrical couplings of the system 200 shown in FIG. 3 are indicated by dashed lines.

As shown, the system 200 includes both a vehicle controller 202 installed on and/or otherwise provided in operative association with the work vehicle 14 configured to tow the implement 10 and an implement controller 204 installed on and/or otherwise provided in operative association with the implement 10. In general, each controller 202, 204 of the disclosed system 200 may correspond to any suitable processor-based device(s), such as a computing device or any combination of computing devices. Thus, in several embodiments, the vehicle controller 202 may include one or more processor(s) 206 and associated memory device(s) 208 configured to perform a variety of computer-implemented functions, such as automatically controlling the operation of one or more components of the work vehicle 14. Similarly, as shown in FIG. 3, the implement controller 204 may also include one or more processor(s) 210 and associated memory devices 212 configured to perform a variety of computer-implemented functions, such as automatically controlling the operation of one or more components of the implement 10.

It should be appreciated that, as used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 208, 212 of the each controller 202, 204 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 208, 212 may generally be configured to store suitable computer-readable instructions that, when implemented by the processor(s) 206, 210 of each controller 202, 204, configure the controller 202, 204 to perform various computer-implemented functions, such as performing the various operations, control functions and/or control actions described herein and/or implementing one or more aspects of the method 300 described below with reference to FIG. 4.

In addition, each controller 202, 204 may also include various other suitable components, such as a communications circuit or module, a network interface, one or more input/output channels, a data/control bus and/or the like, to allow each controller 202, 204 to be communicatively coupled to the other controller and/or to any of the various other system components described herein (e.g., the various wheel load sensors 100, 102). For instance, as shown in FIG. 3, a communicative link or interface 214 (e.g., a data bus) may be provided between the vehicle controller 202 and the implement controller 204 to allow the controllers 202, 204 to communicate with each other via any suitable communications protocol. Specifically, in one embodiment, an ISOBus Class 3 (ISO11783) interface may be utilized to provide a standard communications protocol between the controllers 202, 204. Alternatively, a proprietary communications protocol may be utilized for communications between the vehicle controller 202 and the implement controller 204.

In one embodiment, the vehicle controller 202 may be communicatively coupled to one or more valve assemblies 216 (e.g., valve assembly(ies) 94 described above with reference to FIG. 1) to regulate the supply of hydraulic fluid from a pump 218 and associated fluid tank or supply 220 (e.g., pump 96 and fluid supply 98 described above with reference to FIG. 1) located on the work vehicle 14. Based on control signals from the vehicle controller 202 (which may be generated by the vehicle controller 202 or received from the implement controller 204), the valve assembly(ies) 216 may regulate the supply of hydraulic fluid from the fluid supply 220 to one or more vehicle-based actuators 222 of the work vehicle 14 (e.g., hitch actuators and/or the like) as well as various implement-based actuators 224 of the implement 10 (e.g., the wing actuators 42, 44, the transport wheel actuators 74-84, and the gauge wheel actuators 90, 92), such as by restricting or enabling fluid flow from the fluid supply 220 into the respective actuators via one or more hydraulic lines 226, which may run throughout the vehicle 14 and across to the implement 10. As fluid is supplied into each actuator, the pressure in the associated cylinder increases, causing the actuator to extend. Correspondingly, as fluid flows out of each actuator, the pressure in the corresponding cylinder decreases, causing the actuator to retract.

Thus, by controlling the operation of the valve assembly(ies) 216, the vehicle controller 202 may control the extension/retraction of the various wing actuators 42, 44, thereby allowing the controller 202 to automatically control the actuation of the wing sections 28, 30, 32, 34 during the performance of an unfolding operation. For instance, the controller 202 may be configured to adjust one or more of the flow parameters of the hydraulic fluid supplied to the wing actuators(s) 42, 44 (e.g., the flow rate and/or the pressure of the hydraulic fluid) via control of the operation of the valve assembly(ies) 216, thereby allowing the controller 202 TO control the rate at which the wing sections 28, 30, 32, 34 are being actuated. Specifically, as will be described below, the controller 202 may, in several embodiments, control the operation of the valve assembly(ies) 216 such that hydraulic fluid is supplied to each wing actuator(s) 42, 44 at a given flow rate and pressure to allow the associated wing section(s) 28, 30, 32, 34 to be pivoted towards the ground at a desired pivot or actuation rate. However, once it is detected that such wing section(s) 28, 30, 32, 34 has contacted the ground, the controller 202 may be configured to control the operation of the valve assembly(ies) 216 in a manner that reduces the flow rate and/or the pressure of the hydraulic fluid supplied to the corresponding wing actuator(s) 42, 44, thereby reducing the actuation rate of the wing section(s) 28, 30, 32, 34.

It should be appreciated that, in one embodiment, the valve assembly(ies) 216 may include one or more pressure regulating valves (PRVs) configured to regulate the flow rate and/or pressure of the hydraulic fluid being supplied to the various implement-based actuators 224, including the wing actuators 42, 44. For example, in one embodiment, the valve assembly(ies) 216 may include one or more inner wing PRVs 230 configured to regulate the flow rate and/or pressure of the hydraulic fluid being supplied to the inner wing actuators 42. Additionally, the valve assembly(ies) 216 may include one or more outer wing PRVs 232 configured to regulate the flow rate and/or pressure of the hydraulic fluid being supplied to the outer wing actuators 44. As such, by separately controlling the operation of the PRVs 42, 44, the controller 202 may independently regulate the actuation of the inner and outer wing sections 28, 30, 32, 34, respectively.

During the execution of an unfolding operation, the vehicle controller 202 may be configured to control the operation of the valve assembly(ies) 216, including the PRVs 230, 232, to regulate the supply of hydraulic fluid to the wing actuators 42, 44. For instance, referring to the example of the unfolding sequence described above with reference to FIGS. 2A-2C, the vehicle controller 202 may be configured to initially control the operation of the valve assembly(ies) 216 such that hydraulic fluid is supplied to the inner wing actuators 42 at a given flow rate and pressure, thereby causing the inner wing sections 28, 30 to pivot downwardly relative to the center frame section 26 at a given actuation rate. As the inner wing sections 28, 30 are being pivoted downwardly towards the ground, the implement controller 204 may be configured to continuously monitor the wheel load(s) applied through each of the inner transport wheels 70 (e.g., via the associated wheel load sensor(s) 100) to determine when the wheels 70 initially contact the ground. Once such wheel contact is detected, the implement controller 202 may be configured to transmit suitable control signals instructing the vehicle controller 202 to adjust the flow parameter(s) of the hydraulic fluid being supplied to the inner wing actuators 42 (e.g., via control of the valve assembly(ies) 216) in a manner that reduces the actuation rate of the inner wing sections 28, 30, such as by reducing the flow rate and/or the pressure of the hydraulic fluid supplied to the inner wing actuators 42. Thereafter, the implement controller 202 may continue to monitor the wheel load(s) being applied through the inner transport wheels 70 as the inner wing sections 28, 30 are further pivoted relative to the center frame section 26 at the slower or reduced actuation rate. Once the monitored wheel load(s) is equal to a desired wheel load for the inner wing sections 28, 30 (or falls within a desired wheel load range for the inner wing sections 28, 30), the implement controller 204 may be configured to transmit suitable control signals instructing the vehicle controller 202 terminate or stop further actuation of the inner wing sections 28, 30.

It should be appreciated that, in one embodiment, the implement controller 204 may be configured to detect when the inner wing transport wheels 70 contact the ground by comparing the monitored wheel load(s) to a baseline wheel load for such transport wheels 70. For instance, as the inner wing sections 28, 30 are being pivoted downwardly towards the ground (but prior to such wing sections 28, 30 contacting the ground), a small wheel load may be detected by the wheel load sensors 100 due to, for example, gravity acting on the transport wheels 70. In one embodiment, this detected wheel load (or a load range defined relative to and/or encompassing such wheel load) may be set as the baseline wheel load for the inner wing transport wheels 70. In such an embodiment, the implement controller 204 may detect when the transport wheels 70 contact the ground by detecting an increase in the wheel load(s) applied through the transport wheels 70 over the baseline wheel load. For instance, the implement controller 204 may determine that the transport wheels 70 have contacted the ground when the monitored wheel load initially exceeds the baseline wheel load or when the monitored wheel load exceeds the baseline wheel load by a given threshold amount (e.g., a wheel load that is a given percentage, such as 5%, above the baseline wheel load).

It should also be appreciated that, in several embodiments, the desired wheel load (or wheel load range) at which the vehicle controller 202 is configured to stop further actuation of the inner wing sections 28, 30 may generally correspond to any suitable load value(s). However, in one embodiment, the desired wheel load (or wheel load range) may be selected based on a desired weight distribution for the implement 10. For instance, it may be desirable for a given percentage of the implement weight to be carried by each of the various wing sections 28, 30, 32, 34. In such an embodiment, the desired wheel load (or wheel load range) may be selected such that, when the implement 10 is fully unfolded to its work position, the weight being carried by the inner wing sections 28, 30 corresponds to the associated weight percentage, thereby allowing for the desired weight distribution to be achieved across the width of the implement 10.

A similar control methodology may also be utilized for unfolding the outer wing sections 32, 34 to the work position. For instance, the vehicle controller 202 may be configured to control the operation of the valve assembly(ies) 216 such that hydraulic fluid is supplied to the outer wing actuators 44 at a given flow rate and pressure, thereby causing the outer wing sections 32, 34 to pivot relative to the inner wing sections 28, 30 at a given actuation rate. As the outer wing sections are being pivoted downwardly towards the ground, the implement controller 204 may be configured to continuously monitor the wheel load(s) applied through the outer wing transport wheels 72 and/or the gauge wheels 86, 88 (e.g., via the associated wheel load sensor(s) 100, 102) to determine when the wheels 72, 86, 88 initially contact the ground (e.g., by comparing the monitored wheel load to a baseline wheel load for the outer wing transport wheels 72 and/or the gauge wheels 86, 88). Once such wheel contact is detected, the implement controller 204 may be configured to transmit suitable control signals instructing the vehicle controller 202 to adjust the flow parameter(s) of the hydraulic fluid being supplied to the outer wing actuators 44 (e.g., via control of the valve assembly(ies) 216) in a manner that reduces the actuation rate of the outer wing sections 32, 34, such as by reducing the flow rate and/or the pressure of the hydraulic fluid supplied to the outer wing actuators 44. Thereafter, the implement controller 204 may continue to monitor the wheel load(s) being applied through the wheel(s) 72, 86, 88 of the outer wing sections 32, 34 as such wing sections are further pivoted relative to the inner wing sections 28, 30 at the slower or reduced actuation rate. Once the wheel load(s) is equal to a desired wheel load for the outer wing sections 32, 34 (or falls within a desired wheel load range for the inner wing sections 32, 34), the implement controller 204 may be configured to transmit suitable control signals instructing the vehicle controller 202 terminate or stop further actuation of the outer wing sections 32, 34. Similar to that described above, the desired wheel load (or the desired wheel load range) for the outer wing sections 32, 34 may, for example, be selected based on a desired weight distribution for the implement 10.

It should be appreciated that, although the various control functions and/or actions were generally described above as being executed by one of the system controllers 202, 204, such control functions/actions may generally be executed by either of such controllers 202, 203 and/or may be distributed across both of the controllers 202, 204. For instance, in another embodiment, the sensor data from the wheel load sensors 100, 102 may be passed through the implement controller 204 to the vehicle controller 202. In such an embodiment, the vehicle controller 202 may be configured to analyze the sensor data and generate suitable control signals for controlling the operation of the valve assembly(ies) 216 based on its analysis of the sensor data. In a further embodiment, the implement controller 204 may be configured to directly control the operation of the valve assembly(ies) 216. Such an embodiment may be desirable, for example, when the valve assembly(ies) 216 is located on the implement 10 as opposed to being located on the work vehicle 14.

Figure 4:
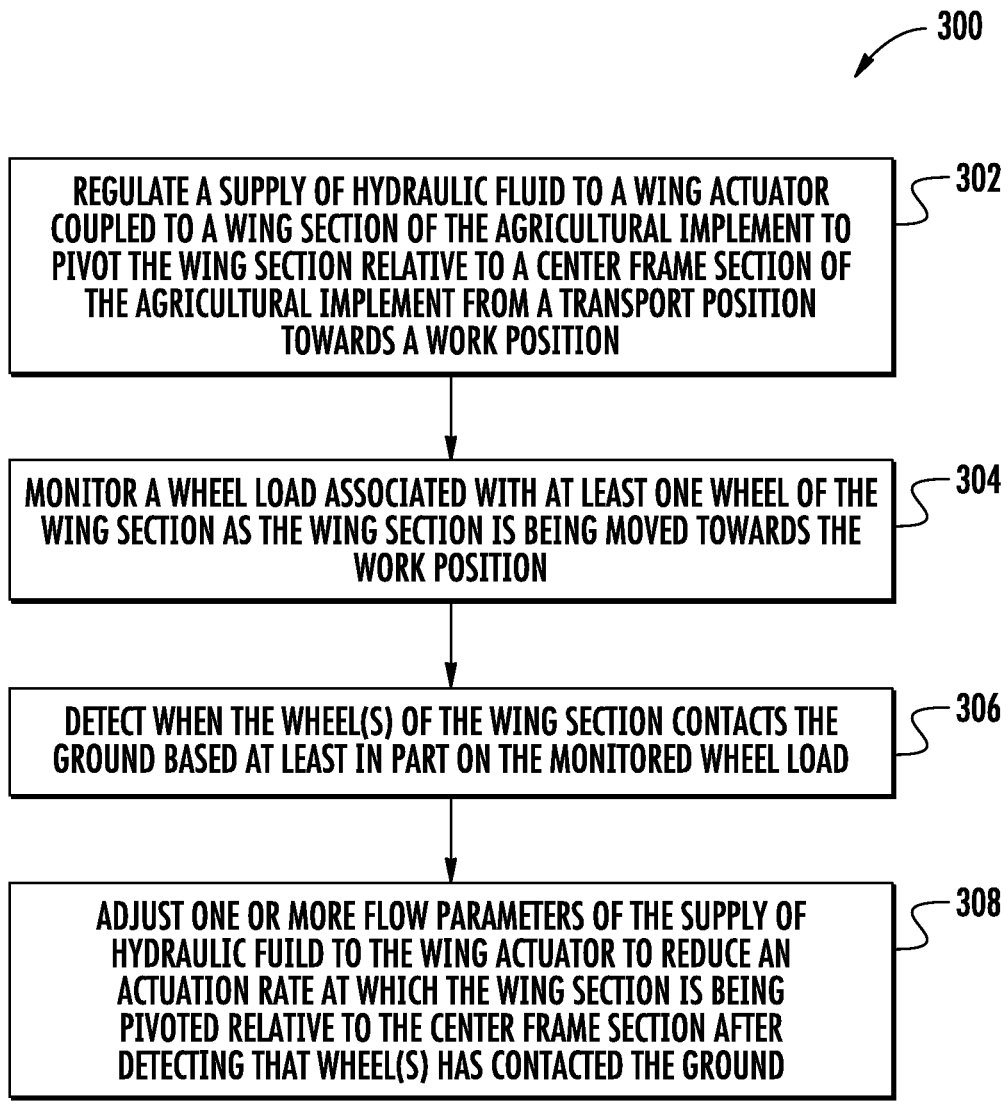
FIG. 4 illustrates a flow diagram of one embodiment of a method for controlling the actuation of wing sections of an agricultural implement during an unfolding operation in accordance with aspects of the present subject matter.

Referring now to FIG. 4, a flow diagram of one embodiment of a method 300 for controlling the actuation of wing sections of an agricultural implement during the performance of an unfolding operation is illustrated in accordance with aspects of the present subject matter. In general, the method 300 will be described herein with reference to the implement 10 shown in FIGS. 1 and 2A-2C, as well as the system 200 shown in FIG. 3. However, it should be appreciated that the disclosed method 300 may be executed with implements having any other suitable configuration and/or with systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (302), the method 300 may include regulating a supply of hydraulic fluid to a wing actuator coupled to a wing section of the agricultural implement to pivot the wing section relative to a center frame section of the agricultural implement from a transport position towards a work position. Specifically, as indicated above, when performing an unfolding operation, the system controller(s) 202, 204 may be configured to control the operation of the valve assembly(ies) 216 so as to regulate the supply of hydraulic fluid to the wing actuators 42, 44 for actuating the wing sections 28, 30, 32, 34 relative to the center frame section 26, such as the inner wing actuators 42 and the outer wing actuators 44. For example, the system controller(s) 202, 204 may initially control the operation of the inner and outer PRVs 230, 232 such that hydraulic fluid is supplied to the wing actuators(s) 42, 44 at a given flow rate and pressure to allow the wing section(s) 28m 30, 32, 34 to be pivoted relative to the center frame section 26 at a desired actuation rate.

Additionally, at (304), the method 300 may include monitoring a wheel load associated with at least one wheel of the wing section as the wing section is being moved towards the work position. For instance, as indicated above, the controller(s) 202, 204 may be communicatively coupled to one or more wheel load sensors 100, 102 for monitoring the wheel load(s) applied through one or more of the wheels 68, 70, 72, 86, 88 supported on the implement 10. As such, the controller(s) 202, 204 may be configured to continuously monitor the wheel load(s) as the wing sections 28, 30, 32, 34 are being actuated or pivoted towards the ground.

Moreover, at (306), the method 300 may include detecting when the wheel(s) of the wing section contacts the ground based at least in part on the monitored wheel load. For example, as indicated above, the system controller(s) 202, 204 may be configured to continuously monitor the wheel load(s) of the wing section(s) 28, 30, 32, 34 being actuated and compare such monitored wheel load(s) to a corresponding baseline wheel load(s). In such an embodiment, when an increase in the monitored wheel load(s) above the baseline wheel load(s) is detected, the controller(s) 202, 204 may determine that the wheel(s) of the wing section(s) 28, 30, 32, 34 being actuated has contacted the ground.

Referring still to FIG. 4, at (308), the method 300 may include adjusting one or more flow parameters of the supply of hydraulic fluid to the wing actuator to reduce an actuation rate at which the wing section is being pivoted relative to the center frame section after detecting that the wheel(s) has contacted the ground. Specifically, as indicated above, when it is detected that the relevant wheel(s) has contacted the ground, the system controller(s) 202, 204 may, for example, be configured to reduce the flow rate and/or pressure of the hydraulic fluid being supplied to the associated wing actuator(s) 42, 44, thereby reducing the actuation rate of the wing section(s) 28, 30, 32, 34. Thereafter, the system controller(s) 202, 204 may continue to monitor the wheel load(s) to determine when the wheel load(s) is equal to a desired wheel load (or falls within a desired wheel load range) for the corresponding wheel(s). Once the monitored wheel load(s) is equal to the desired wheel load (or falls within a desired wheel load range), the actuation of the wing section(s) 28, 30, 32, 34 may be stopped or terminated.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling the actuation of wing sections of an agricultural implement during an unfolding operation, the method comprising:

regulating, with one or more computing devices, a supply of hydraulic fluid to a wing actuator coupled to a wing section of the agricultural implement to pivot the wing section relative to a center frame section of the agricultural implement in a first pivot direction from a transport position towards a work position, with at least one wheel of the wing section being raised relative to the ground when the wing section is at the transport position;

monitoring, with the one or more computing devices, a wheel load associated with the at least one wheel of the wing section as the wing section is being moved towards the work position;

detecting, with the one or more computing devices, when the at least one wheel of the wing section contacts the ground based at least in part on the monitored wheel load; and after detecting that the at least one wheel has contacted the ground, adjusting, with the one or more computing devices, one or more flow parameters of the supply of hydraulic fluid to the wing actuator to reduce an actuation rate at which the wing section is being pivoted in the first pivot direction relative to the center frame section.

2. The method of claim 1, further comprising continuing to pivot the wing section relative to the center frame section in the first pivot direction after adjusting the one or more flow parameters until the monitored wheel load is equal to a desired wheel load or falls within a desired wheel load range.

3. The method of claim 2, wherein the desired wheel load or the desired wheel load range is selected based on a desired weight distribution for the agricultural implement when at the work position.

4. The method of claim 1, wherein monitoring the wheel load associated with the at least one wheel comprises monitoring the wheel load relative to a baseline wheel load associated with the at least one wheel.

5. The method of claim 4, wherein detecting when the at least one wheel of the wing section contacts the ground comprises detecting an increase in the monitored wheel load above the baseline wheel load resulting from the at least one wheel contacting the ground.

6. The method of claim 1, wherein monitoring the wheel load associated with the at least one wheel comprises receiving sensor data from at least one wheel load sensor that is indicative of the wheel load.

7. The method of claim 6, wherein the at least one wheel load sensor comprises at least one sensor configured to detect a load applied through a wheel actuator associated with the at least one wheel.

8. The method of claim 6, wherein the at least one wheel load sensor comprises at least one sensor configured to detect a load applied directly through the at least one wheel.

9. The method of claim 1, wherein adjusting the one or more flow parameters of the supply of hydraulic fluid to the wing actuator comprises reducing at least one of a flow rate or a fluid pressure of the supply of hydraulic fluid to the wing actuator.

10. The method of claim 1, wherein the wing section comprises an inner wing section of the agricultural implement, further comprising:
regulating a supply of hydraulic fluid to an outer wing actuator coupled between the inner wing section and an outer wing section of the agricultural implement to pivot the outer wing section relative to the inner wing section;
monitoring an outer wheel load associated with at least one wheel of the outer wing section as the outer wing section is being pivoted relative to the inner wing section;
detecting when the at least one wheel of the outer wing section contacts the ground based at least in part on the monitored outer wheel load; and
after detecting that the at least one wheel of the outer wing section has contacted the ground, adjusting one or more flow parameters of the supply of hydraulic fluid to the outer wing actuator to reduce an actuation rate at which the outer wing section is being pivoted relative to the inner wing section.

11. A system for controlling the actuation of implement wing sections during an unfolding operation, the system comprising:
an agricultural implement including a center frame section and a wing section pivotable relative to the center frame section, the wing section including at least one wheel coupled thereto;
a wing actuator coupled to the wing section, the wing actuator configured to pivot the wing section relative to the center frame section between a transport position and a work position, the at least one wheel of the wing section being raised relative to the ground when the wing section is at the transport position;
a valve assembly configured to regulate a supply of hydraulic fluid to the wing actuator; and
at least one controller communicatively coupled to the valve assembly, the at least one controller including a processor and associated memory, the memory storing instructions that, when executed by the processor, configure the at least one controller to:
control an operation of the valve assembly to regulate the supply of hydraulic fluid to the wing actuator in order to pivot the wing section relative to the center frame section in a first pivot direction from the transport position towards the work position;
monitor a wheel load associated with at least one wheel of the wing section as the wing section is being moved towards the work position;
detect when the at least one wheel of the wing section contacts the ground based at least in part on the monitored wheel load; and
after detecting that the at least one wheel has contacted the ground, control the operation of the valve assembly to adjust one or more flow parameters of the supply of hydraulic fluid to the wing actuator to reduce an actuation rate at which the wing section is being pivoted in the first pivot direction relative to the center frame section.

12. The system of claim 11, wherein the at least one controller is further configured to continue to pivot the wing section relative to the center frame section in the first pivot direction after adjusting the one or more flow parameters until the monitored wheel load is equal to a desired wheel load or falls within a desired wheel load range.

13. The system of claim 12, wherein the desired wheel load or the desired wheel load range is selected based on a desired weight distribution for the agricultural implement when at the work position.

14. The system of claim 11, wherein the at least one controller is configured to monitor the wheel load relative to a baseline wheel load associated with the at least one wheel.

15. The system of claim 14, wherein the at least one controller is configured to detect when the at least one wheel of the wing section contacts the ground by detecting an increase in the monitored wheel load above the baseline wheel load resulting from the at least one wheel contacting the ground.

16. The system of claim 11, wherein the at least one controller is further configured to receive sensor data from at least one wheel load sensor that is indicative of the wheel load.

17. The system of claim 16, wherein the at least one wheel load sensor comprises at least one sensor configured to detect a load applied through a wheel actuator associated with the at least one wheel.

18. The system of claim 16, wherein the at least one wheel load sensor comprises at least one sensor configured to detect a load applied directly through the at least one wheel.

19. The system of claim 11, wherein the at least one controller is configured to reduce at least one of a flow rate or a fluid pressure of the supply of hydraulic fluid to the wing actuator to reduce the actuation rate at which the wing section is being pivoted relative to the center frame section.

20. The system of claim 11, wherein the wing section comprises an inner wing section of the agricultural implement, the controller being further configured to:
regulate a supply of hydraulic fluid to an outer wing actuator coupled between the inner wing section and an outer wing section of the agricultural implement to pivot the outer wing section relative to the inner wing section;
monitor an outer wheel load associated with at least one wheel of the outer wing section as the outer wing section is being pivoted relative to the inner wing section;
detect when the at least one wheel of the outer wing section contacts the ground based at least in part on the monitored outer wheel load; and
after detecting that the at least one wheel of the outer wing section has contacted the ground, adjust one or more flow parameters of the supply of hydraulic fluid to the outer wing actuator to reduce an actuation rate at which the outer wing section is being pivoted relative to the inner wing section.

* * * * *